US008318378B2

(12) United States Patent
Saito et al.

(10) Patent No.: US 8,318,378 B2
(45) Date of Patent: Nov. 27, 2012

(54) FUEL CELL AND FUEL CELL FASTENING DEVICE

(75) Inventors: Norihiko Saito, Toyota (JP); Kimihide Horio, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 296 days.

(21) Appl. No.: 12/529,381

(22) PCT Filed: May 21, 2008

(86) PCT No.: PCT/IB2008/001268

§ 371 (c)(1), (2), (4) Date: Sep. 1, 2009

(87) PCT Pub. No.: WO2008/142539

PCT Pub. Date: Nov. 27, 2008

(65) Prior Publication Data

US 2010/0092836 A1 Apr. 15, 2010

(30) Foreign Application Priority Data

May 23, 2007 (JP) ................................ 2007-136533

(51) Int. Cl.
*H01M 2/02* (2006.01)

(52) U.S. Cl. ......................... 429/507; 429/508; 429/511

(58) Field of Classification Search .................. 429/507, 429/508, 511
See application file for complete search history.

(56) References Cited

U.S. PATENT DOCUMENTS

| | | | |
|---|---|---|---|
| 6,669,826 | B1 | 12/2003 | Milgate, Jr. et al. |
| 2006/0240307 | A1 | 10/2006 | Suh |

FOREIGN PATENT DOCUMENTS

| | | | |
|---|---|---|---|
| GB | 2336937 | A | 11/1999 |
| JP | 2004185845 | A | 7/2004 |
| JP | 2006302900 | A | 11/2006 |

*Primary Examiner* — Jane Rhee
(74) *Attorney, Agent, or Firm* — Gifford, Krass, Sprinkle, Anderson & Citkowski, P.C.

(57) ABSTRACT

A fuel cell (10) includes a fuel cell stack (50) in which a plurality of fuel cell units are stacked on one another, a pair of end plates (61, 61*b*, 63, 63*b*) respectively contact both ends of the fuel cell stack in a direction (Ds) in which the plurality of fuel cell units are stacked, and a side member (62, 62*b*, 62*g*) that extends in the stacking direction and is disposed between the end plates. The fuel cell further includes a connecting bolt portion, having a bolt shank (644, 624*g*) that penetrates one of the end plates substantially along the stacking direction. The connecting bolt portion connects the one of the end plates and the side member. The fuel cell further includes a cushion joint (66, 66*a*, 66*b*, 66*c*, 66*d*, 66*e*, 66*f*) disposed between the side member and one of the end plates, and through which the bolt shank passes.

17 Claims, 12 Drawing Sheets

10
50
510
64
64
618
660
670
66
63
A
A
62
60
670
660
66
61

10
64
A
A
660
670
66
63
60
62
670
660
66
61
50
510
64
618

10
62
510
50
61
614
64
618
63
626
660
670
66

200
50
410
420
120
110
300
320
OXIDANT GAS
FUEL GAS
200
H_IN
W_OUT
A_IN
W_IN
A_OUT
H_OUT

FUEL CELL AND FUEL CELL FASTENING DEVICE

CROSS-REFERENCE TO RELATED APPLICATIONS

This application is the U.S. national phase of PCT/IB2008/001268 filed May 21, 2008, which claims priority of Japanese Patent Application No. 2007-136533 filed May 23, 2007.

BACKGROUND OF THE INVENTION

1. Field of the Invention

The present invention relates to a fuel cell that includes a fuel cell stack in which multiple fuel cell units are stacked on one another and electrochemically generates electricity using reaction gas. In particular, the present invention relates to a structure that fastens the fuel cell stack of the fuel cell.

2. Description of the Related Art

To fasten a fuel cell stack of a fuel cell, the fuel cell sometimes includes a pair of end plates respectively contact both ends of the fuel cell stack in a stacking direction of the fuel cell stack, side plates that extend in the stacking direction and disposed between the pair of end plates, and connecting bolts that connect the end plates and side members. Japanese Patent Application Publication No. 2004-185845 (JP-A-2004-185845) and Japanese Patent Application Publication No, 2006-302900 (JP-A-2006-302900) describe fuel cells in which end plates are connected to side members by connecting bolts.

As shown in FIG. 15, in a case where the end plate 61*r* is connected to the side member 62*r* by the connecting bolt 64*r* extending in the stacking direction, if the side member 62*r* is bent in a direction intersecting the stacking direction, the side member 62*r* operates as a nail puller that applies leverage to the connecting bolt 64*r* about the fulcrum Ps, and the stress is concentrated on the portion Pb of the connecting bolt 64*r* in the vicinity of where the end plate 61*r* contacts the side member 62*r*. Accordingly, to secure sufficient strength, the size of the connecting bolt used in such a fastening structure needs to be sufficiently large. As a result, the size of the fuel cell increases.

SUMMARY OF THE INVENTION

The present invention provides a fuel cell and a fuel cell fastening device that improves the strength against the force in a direction intersecting the stacking direction of the fuel cell stack.

The first aspect of the present invention provides a fuel cell that electrochemically generates electricity using reaction gas. The fuel cell includes a fuel cell stack in which a plurality of fuel cell units are stacked on one another; a pair of end plates respectively contact both ends of the fuel cell stack in a direction in which the plurality of fuel cell units are stacked; a side member that extends in the stacking direction and is disposed between the pair of end plates; a connecting bolt portion that has a bolt shank penetrating one of the end plates substantially along the stacking direction, and connects the one of the end plates and the side member; and a cushion joint disposed between the side member and the one of the end plates, and through which the bolt shank passes.

According to the fuel cell of the first aspect of the invention, when the side member is bent in the direction intersecting the stacking direction, the bolt shank is bent with the side member in the cushion joint, thereby reducing the leverage or force in a direction of pulling out the bolt shank applied to the bolt shank by the side member and suppressing/preventing the stress from being concentrated on a single portion of the bolt shank. Accordingly, the size of the bolt shank does not need to be much increased, and the strength against the force in the direction intersecting the stacking direction of the fuel cell stack improves.

The cushion joint may include a first spherical joint provided on the side of the one of the end plates, and having a first through hole in which the bolt shank is fitted freely and a first spherical surface facing toward the side member; and a second spherical joint provided on the side of the side member, and having a second through hole in which the bolt shank is fitted freely and a second spherical surface that slidably engages with the first spherical surface of the first spherical joint.

According to this construction, slidable movement between the first spherical joint and the second spherical joint allows the bolt shank to bend in the cushion joint when the side member is bent in the direction intersecting the stacking direction. The material of the first spherical joint and the second spherical joint may be any material having hardness that maintains the shape of slidable spherical surface under the condition in which the first and second spherical joints are held between the end plate and the side member. The material may be iron steel or ceramics.

The diameter of the second through hole may be greater than the diameter of the first through hole. According to this construction, the area in which the cushion joint is movable can be expanded, as compared with the case in which the diameter of the first through hole is the same as the diameter of the second through hole. As a result, concentration of stress on a single portion of the bolt shank is further suppressed.

The cushion joint may further include an elastic ring that fills the gap between at least one of the first through hole and the second through hole and the bolt shank. According to this construction, the centers of the spherical surfaces of the first and second spherical joints are easily positioned on the shaft center of the bolt shank. Accordingly, the area in which the first and second spherical joints are movable relative to each other is prevented or suppressed from being narrowed by the misalignment between the center of the spherical surface and the shaft center of the bolt shank.

The first spherical joint may include a first engagement portion that is fitted in the one of the end plates to position the first spherical joint. According to this construction, the center of the spherical surface of the first spherical joint is easily positioned on the shaft center of the bolt shank. As a result, the area in which the first and second spherical joints are movable relative to each other is prevented or suppressed from being narrowed by the misalignment between the center of the spherical surface and the shaft center of the bolt shank.

The second spherical joint may include a second engagement portion that is fitted in the side member to position the second spherical joint. According to this construction, the center of the spherical surface of the second spherical joint is easily positioned on the shaft center of the bolt shank. As a result, the area in which the first and second spherical joints are movable relative to each other is prevented or suppressed from being narrowed by the misalignment between the center of the spherical surface and the shaft center of the bolt shank.

Roughness of at least one of the first spherical surface and the second spherical surface may be coarser than roughness of other surface of the cushion joint. According to this construction, the friction coefficient between the first spherical surface and the second spherical surface is adjusted such that the concave spherical joint slides before the bolt shank is plastically deformed. As a result, the side member is prevented from being bent excessively to the point that the bolt shank is plastically deformed.

The cushion joint may further include a rod-like pin embedded in the first spherical joint and the second spherical joint. The strength of the pin is adjusted such that the pin is cut or broken before the bolt shank is plastically deformed. As a result, the side member is prevented from being bent excessively to the point that the bolt shank is plastically deformed.

The cushion joint may further include a tubular cover that holds the first spherical joint and the second spherical joint. The strength of the cover is adjusted such that the cover is deformed before the bolt shank is plastically deformed. As a result, the side member is prevented from being bent excessively to the point that the bolt shank is plastically deformed.

The cushion joint may further include a beam extending over the one of the end plates, the first spherical joint, the second spherical joint and the side member. According to this construction, the strength of the beam is adjusted such that the beam is cut or broken before the bolt shank is plastically deformed. As a result, the side member is prevented from being bent excessively to the point that the bolt shank is plastically deformed.

At least a portion of the cushion joint may be formed of an elastic body. According to this construction, when the side member is bent in the direction intersecting the stacking direction, the bolt shank can be bent in the cushion joint, because the elastic body of the cushion joint is deformed. The elastic member of the cushion joint may be made of any material that has the elasticity and shape allowing the bolt shank to bend under the condition in which the cushion joint is held between the end plate and the side member. The cushion joint may be a coil spring, or a tubular member made of engineering plastics, such as polyacetal or polyamides, hard rubber, or laminated rubber in which rubber layers and hard material layers are alternately laminated.

Second aspect of the present invention provides a fuel cell fastening device that fastens a cell stack in which a plurality of fuel cell units are stacked on one another. The fuel cell fastening device includes: a pair of end plates respectively contact both ends of the fuel cell stack in a direction in which the plurality of fuel cell units are stacked; a side member that extends in the stacking direction and is disposed between the pair of end plates; a connecting bolt portion that has a bolt shank that penetrates one of the end plates substantially along the stacking direction, and connects the one of the end plates and the side member; and a cushion joint disposed between the side member and the one of the end plate, and through which the bolt shank passes.

According to the fuel cell fastening device of the second aspect of the present invention, when the side member is bent in the direction intersecting the stacking direction, the bolt shank is bent with the side member in the cushion joint, thereby reducing the leverage or force in a direction of pulling out the bolt shank applied to the bolt shank by the side member and preventing concentration of stress on a single portion of the bolt shank. Accordingly, the size of the bolt shank does not need to be much increased, and the strength against the force in the direction intersecting the stacking direction of the fuel cell stack improves.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Fuel cells according to embodiments of the present invention will be described in detail with reference to the drawings.

Figure 1:
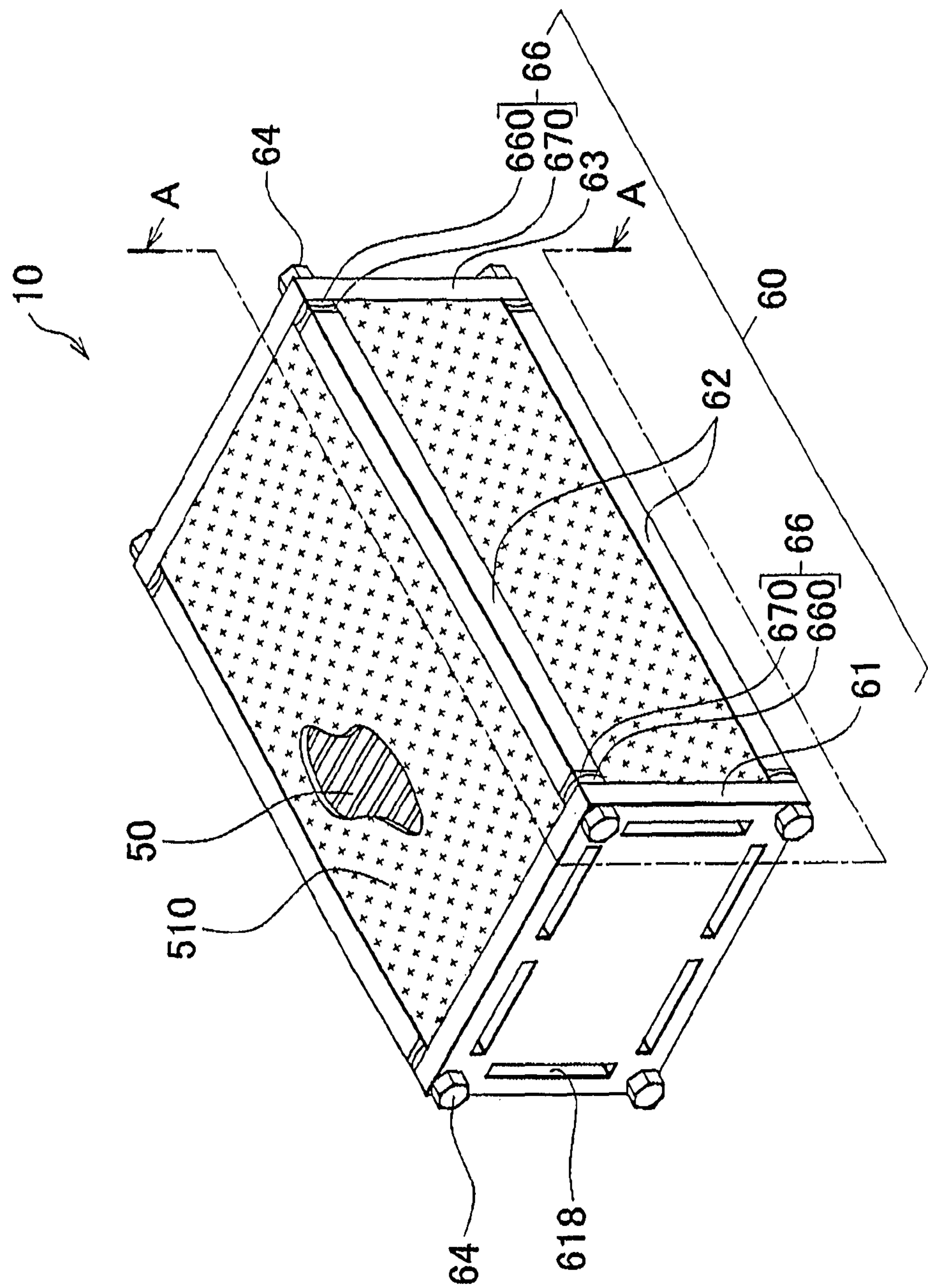
FIG. 1 is a perspective view illustrating an entire construction of a fuel cell according to an embodiment of the present invention.
Figure 2:
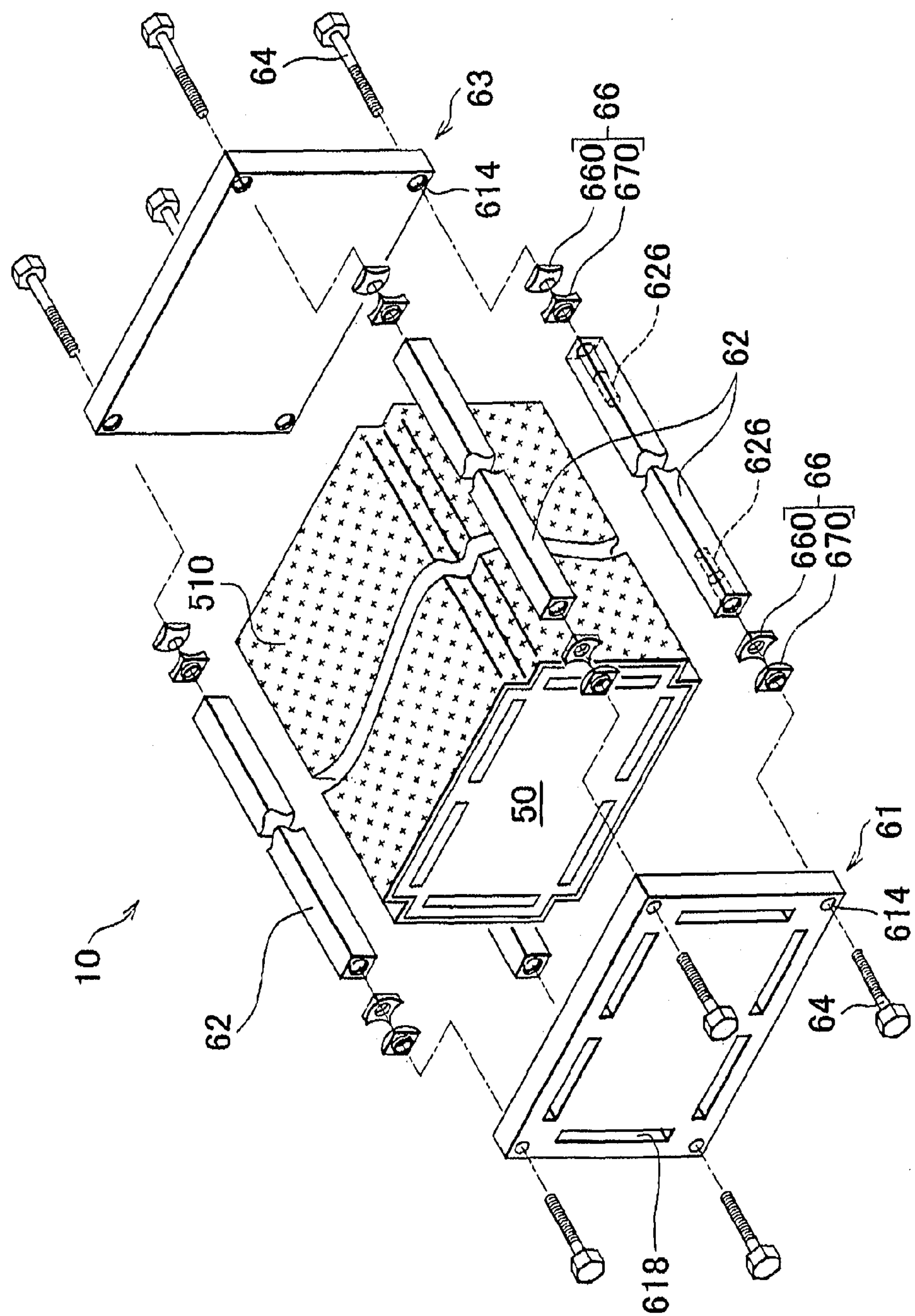
FIG. 2 is an exploded perspective view illustrating the entire construction of the fuel cell.
Figure 3:
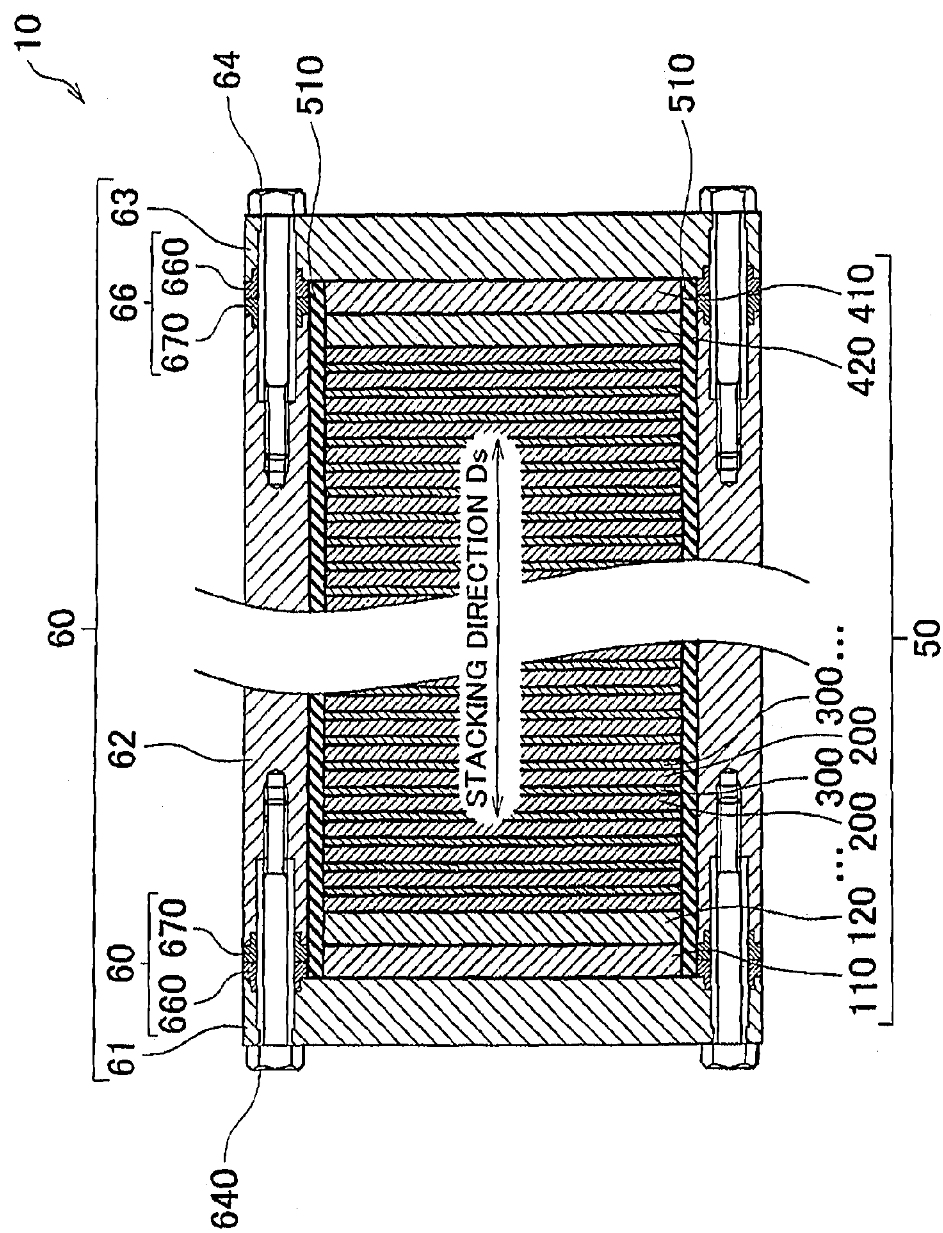
FIG. 3 is a cross-sectional view illustrating a cross-section of the fuel cell taken on the plane indicated by the line A-A of FIG. 1.

FIG. 1 is a perspective view illustrating an entire construction of a fuel cell 10. FIG. 2 is an exploded perspective view illustrating the entire construction of the fuel cell 10. FIG. 3 is a cross-sectional view illustrating a cross-section of the fuel cell 10 taken on a plane indicated by the line A-A of FIG. 1. As shown in FIGS. 1, 2 and 3, the fuel cell 10 includes a fuel cell stack 50 in which multiple fuel cell units are stacked on one another, and a fastening device 60 that fastens the fuel cell stack 50. The fuel cell 10 generates electricity through an electrochemical reaction of reaction gas supplied from a gas supply portion (not shown) such as a tank or a reformer.

In this embodiment, the fuel cell 10 includes a proton-exchange membrane fuel cell. Reaction gas used in the fuel cell 10 includes fuel gas containing hydrogen and oxidant gas containing oxygen. The fuel gas used in the fuel cell 10 may be hydrogen gas stored in a hydrogen tank or a hydrogen storing alloy, or hydrogen gas obtained by reforming hydrocarbon fuel. The oxidant gas used in the fuel cell 10 may be, for example, air introduced from ambient air. In this embodiment, the fuel cell 10 is a recirculation type fuel cell, which recirculates and reuses fuel gas. Hydrogen concentration in the fuel gas supplied to the fuel cell 10 decreases, as the electrochemical reaction proceeds, and the fuel gas is discharged to the outside of the fuel cell 10 as anode off-gas. The anode off-gas is reused as fuel gas. Oxygen concentration in the oxidant gas supplied to the fuel cell 10 decreases, as the electrochemical reaction proceeds, and the oxidant gas is discharged to the outside of the fuel cell 10 as cathode off-gas.

Figure 4:
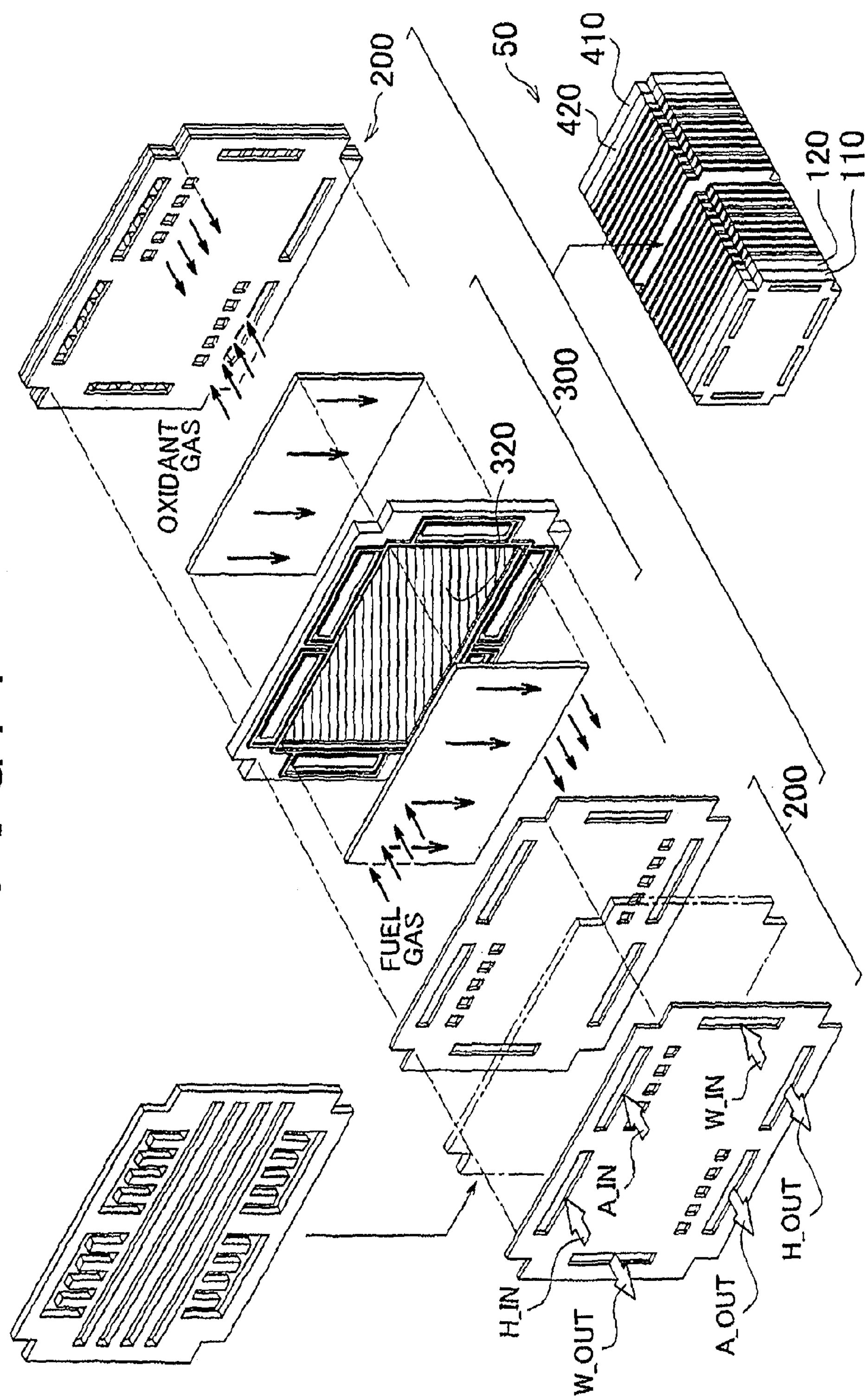
FIG. 4 is a view illustrating a detailed construction of a fuel cell stack.

FIG. 4 is a view illustrating a detailed construction of a fuel cell stack 50. As shown in FIG. 4, the fuel cell stack 50 is formed by stacking multiple plate members formed in a generally identical shape. The fuel cell stack 50 is a columnar solid with a cross-section in the shape of the plate members. In this embodiment, as shown in FIGS. 2 and 4, the fuel cell stack 50 has a rectangular cross-section with four corners cut off at any position in the direction perpendicular to the stacking direction Ds (FIG. 3). The fuel cell stack 50 of the fuel cell 10 is provided with generator plates 300, each having a membrane electrode assembly 320 in which electrochemical reaction of reaction gas is performed, and separators 200 that supply the reaction gas to the generator plates 300. The generator plates 300 and the separators 200 are stacked alternately. Thus, in the fuel cell stack 50, multiple fuel cell units, each includes a generator plate 300 interposed between two separators 200, are formed. The fuel cell stack 50 is provided with a pair of terminals 120, 420 that hold the stack structure, in which the separators 200 and the generator plates 300 are alternately stacked, from both sides, and collect electricity generated by each of the fuel cell units. The fuel cell stack 50 is further provided with insulators 110, 410 that hold the stack structure held by the terminals 120, 420, from both sides and insulate the stack structure.

In this embodiment, the fuel cell 10 is provided with, as shown in FIGS. 1, 2 and 3, a binding sheet 510 that protects the fuel cell stack 50. The binding sheet 510 covers the side surfaces of the fuel cell stack 50 extending in the stacking direction Ds of the fuel cell stack 50. In this embodiment, the binding sheet 510 includes a sheet member made of rubber or urethane.

As shown in FIGS. 1, 2 and 3, the fastening device 60 of the fuel cell 10 is provided with a pair of end plates 61, 63, side members 62, connecting bolts 64 and cushion joints 66. The end plates 61, 63 hold the fuel cell stack 50 therebetween from both ends in the stacking direction Ds. The side members 62 are disposed between the end plate 61 and the end plate 63, and generally extend along the stacking direction Ds of the fuel cell stack 50. The connecting bolts 64 connect each of the end plates 61, 63 to each side member 62. The cushion joints 66 are respectively disposed between the end plates 61, 63 and side members 62.

In this embodiment, each cushion joint 66 in the fastening device 60 includes a convex spherical joint 660 disposed on the side of the end plate 61, 63, and a concave spherical joint 670 disposed on the side of the side member 62. The convex spherical joint 660 and the concave spherical joint 670 slidably contact each other. In this embodiment, the convex spherical joint 660 and the concave spherical joint 670 are plate members made of iron steel. However, the convex spherical joint 660 and the concave spherical joint 670 may be made of any material that has hardness sufficient to maintain the shape that makes them slidable on each other in a condition in which they are held between each of the end plate 61, 63 and the side member 62. For example, the convex spherical joint 660 and the concave spherical joint 670 may be an alloy or ceramics. The construction of the convex spherical joint 660 and the concave spherical joint 670 will be described in detail later.

Figure 5:
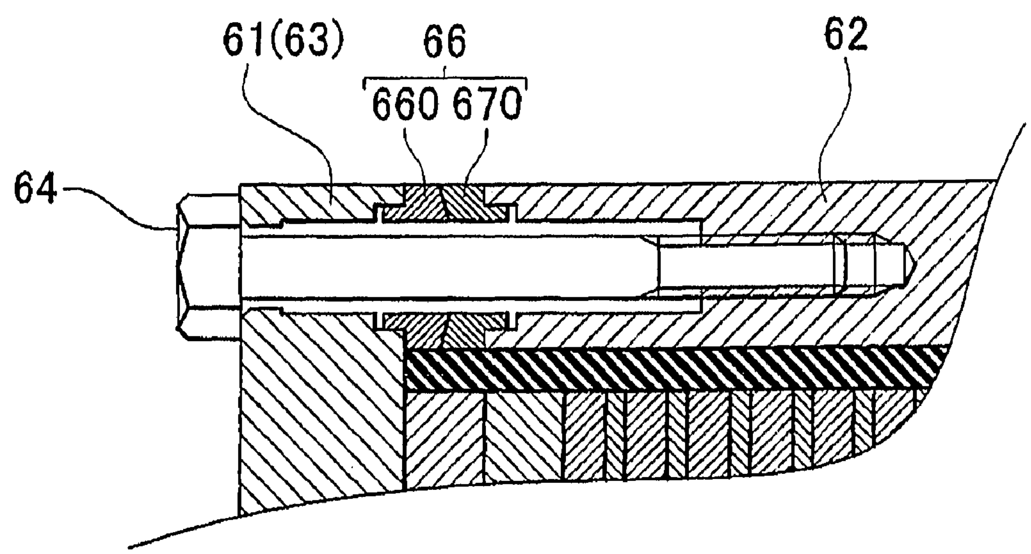
FIG. 5 is an enlarged cross-sectional view illustrating a detailed fastening structure that connects an end plate and a side member by a connecting bolt.
Figure 6:
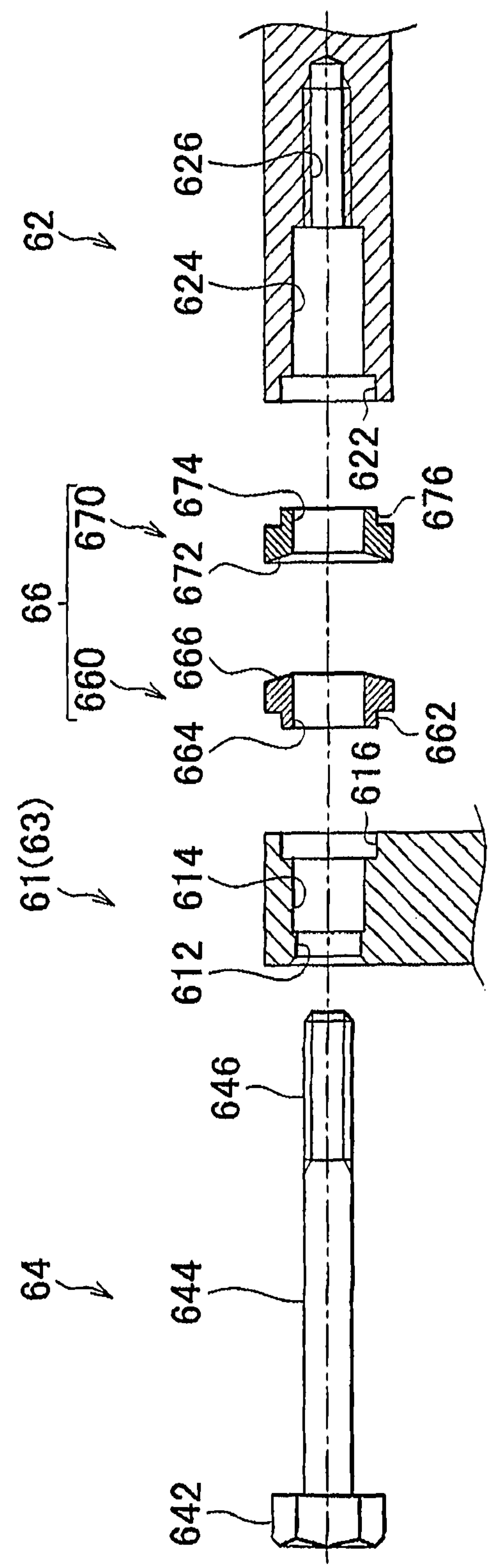
FIG. 6 is an exploded cross-sectional view illustrating the detailed fastening structure that connects the end plate and the side member by the connecting bolt.

FIG. 5 is an enlarged cross-sectional view illustrating a detailed fastening structure that connects the end plate 61, 63 and the side member 62 by the connecting bolt 64. FIG. 6 is an exploded cross-sectional view illustrating the detailed fastening structure that connects each of the end plates 61, 63 and the side member 62 by the connecting bolt 64. The connecting bolt 64 in the fastening device 60 is a metal bolt having a bolt shank 644 in a shape of round bar. A male thread portion 646 is formed at one end of the bolt shank 644. A bolt head 642, which has a hexagonal shape larger than the diameter of the bolt shank 644, is formed at the other end of the bolt shank 644. The end plate 61, 63 and the side member 62 are connected by applying a bolt axial force to the bolt shank 644.

As shown in FIGS. 1, 2 and 3, each of the end plates 61, 63 in the fastening device 60 is a metal plate member having a shape matching the cross-sectional shape of the fuel cell stack 50. Each end plate 61, 63 has through holes 614 at positions corresponding to the side members 62. The connecting bolt 64 passes through each through hole 614 generally along the stacking direction Ds. In addition to the through holes 614, the end plate 61 has through holes 618 that communicate with flow paths provided in the fuel cell stack 50 to supply and discharge reaction gas and coolant water. As shown in FIGS. 5 and 6, the through hole 614 in the end plate 61, 63 has a diameter slightly larger than the diameter of the bolt shank 644 of the connecting bolt 64. At an end of the through hole 614 located on the side from which the connecting bolt 64 is inserted, an insertion opening 612 having a diameter slightly smaller than the diameter of the through hole 614 is formed. At another end of the through hole 614, an engagement opening 616 that engages with the convex spherical joint 660 of the cushion joint 66 is formed.

As shown in FIGS. 1, 2 and 3, the side member 62 in the fastening device 60 is a metal columnar member. Female thread portions 626 that engage with the male portions 646 of the connecting bolts 64 are respectively formed at both ends of side member 62 on the side of end plate 61 and on the side of the end plate 63. As shown in FIGS. 5 and 6, a hole 624 by spot facing having a diameter slightly larger than the diameter of the bolt shank 644 of the connecting bolt 64 is formed adjacent to the opening end of the female thread portion 626. An engagement opening 622 that engages with the concave spherical joint 670 of the cushion joint 66 is formed adjacent to the opening end of the hole 624. In this embodiment, the fuel cell 10 includes four side members, each is formed in a rectangular column. The four side members 62 are disposed so as to fit in four corners of the fuel cell stack 50 and abuts on the fuel cell stack 50 via the binding sheet 510.

The convex spherical joint 660 of the cushion joint 66 has a through hole 664, an engagement portion 662 and a convex spherical surface 666. The through hole 664 has a diameter slightly larger than the diameter of the bolt shank 644 of the connecting bolt 64. The engagement portion 662 is fitted in the engagement opening 616 of the end plate 61, 63. The convex spherical surface 666 faces toward the side of side member 62. The concave spherical joint 670 of the cushion joint 66 has a through hole 674, an engagement portion 676 and a concave spherical surface 672. The through hole 674 has a diameter slightly larger than the diameter of the bolt shank 644 of the connecting bolt 64. The engagement portion 676 is fitted in the engagement opening 622 in the side member 62. The concave spherical surface 672 slidably engages with the convex spherical surface 666 of the convex spherical joint 660. Because the diameters of the through holes 664 and 674 are slightly larger than the diameter of the bolt shank 644, the bolt shank is fitted freely in the through holes 664 and 674.

In this embodiment, as shown in FIG. 5, the through hole 614 in the end plate 61, 63, the through hole 664 in the convex spherical joint 660, the through hole 674 in the concave spherical joint 670, the hole 624 in the side member 62 have generally the same diameter. The through hole 614, the through hole 664, the through hole 674 and the hole 624 communicate with each other.

Figure 7:
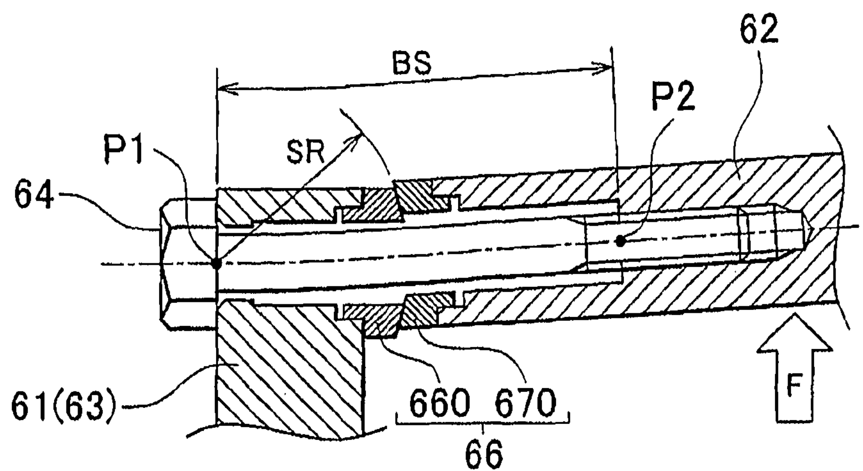
FIG. 7 is a view illustrating a situation in which force F in a direction intersecting the stacking direction Ds is applied to the side member in the fastening structure shown in FIG. 5.

FIG. 7 is a view illustrating a situation when force F in a direction intersecting the stacking direction Ds is applied to the side member in the fastening structure shown in FIG. 5. The center of the convex spherical surface 666 of the convex spherical joint 660 and the center of the concave spherical surface 672 of the concave spherical joint 670 coincide with each other at point P1. The point P1 is located on the side of the bolt head 642 of the connecting bolt 64 and generally on the shaft center of the bolt shank 644. In the example, shown in FIG. 7, the bolt shank 644 of the connecting bolt 64 is threaded with the female thread portion 626 of the side member 62 up to the point P2 on its shaft center.

When the force F applied to the side member 62 exceeds the frictional force between the convex spherical surface 666 and the concave spherical surface 672, the concave spherical joint 670 slides with respect to the convex spherical joint 660 with the point P1 as fulcrum. Thus, the cushion joint 66 allows the portion BS of the bolt shank 644 of the connecting bolt 64 between the point P1 and the point P2 to bend in the cushion joint 66. In this embodiment, in order to adjust the frictional force between the convex spherical surface 666 and the concave spherical surface 672, a surface treatment is applied on at least one of the convex spherical surface 666 and the concave spherical surface 672 such that the roughness of at least one of the convex spherical surface 666 and the concave spherical surface 672 is coarser than other surfaces of the cushion joint 66.

According to the fuel cell 10 described above, if the side member 62 is bent in a direction intersecting the stacking direction Ds, the bolt shank 644 is bent with the side member 62 in the cushion joint 66. Thus, the leverage force in a direction of pulling out the bolt shank applied to the bolt shank 644 by the side member 62 is reduced, and concentration of stress on a single portion of the bolt shank 644 is suppressed or prevented. Accordingly, the size of the bolt shank 644 does not need to be much increased, and the strength against the force F in the direction intersecting the stacking direction Ds of the fuel cell stack 50 improves.

Further, the cushion joint 66 is formed of the concave spherical joint 670 and the convex spherical joint 660, and the concave spherical joint 670 and the convex spherical joint 660 are slidably moved on each other. Accordingly, when the side member 62 is bent in a direction intersecting the stacking direction Ds, the bolt shank 644 can bend in the cushion joint 66.

Further, by fitting the engagement portion 662 of the convex spherical joint 660 in the engagement opening 616 in the end plate 61, 63, the concave spherical joint 660 is positioned with respect to the end plate 61, 63. Thus, the center of the convex spherical surface 666 of the convex spherical joint 660 is easily positioned on the shaft center of the bolt shank 644. As a result, the area in which the concave spherical joint 670 is movable is prevented or suppressed from being narrowed by the misalignment between the center of the convex spherical surface 666 and the shaft center of the bolt shank 644.

Further, by fitting the engagement potion 676 of the concave spherical joint 670 in the engagement opening 622 in the side member 62, the concave spherical joint 670 is positioned with respect to the side member 62. Thus, the center of the concave spherical surface 672 of the concave spherical joint 670 is easily positioned on the shaft center of the bolt shank 644. As a result, the area in which the concave spherical joint 670 is movable is prevented or suppressed from being narrowed by the misalignment between the center of the concave spherical surface 672 and the shaft center of the bolt shank 644.

Further, roughness of at least one of the convex spherical surface 666 and the concave spherical surface 672 is coarser than that of other surfaces of the cushion joint 66. Thus, the friction coefficient between the convex spherical surface 666 and the concave spherical surface 672 can be adjusted such that the concave spherical joint 670 slides before the bolt shank 644 is plastically deformed. As a result, the side member 62 is prevented from being bent excessively to the point that the bolt shank 644 is plastically deformed.

As described above, while some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention. For example, the following modifications may be available.

Figure 8:
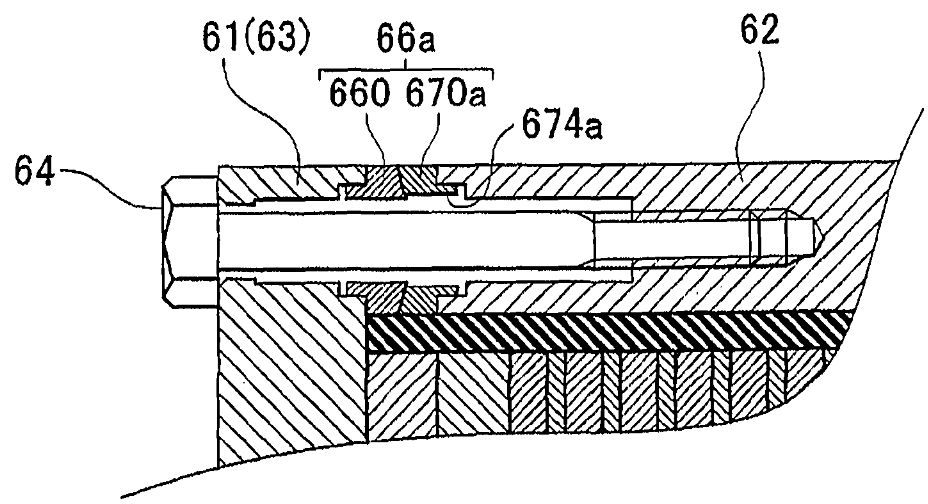
FIG. 8 is an enlarged cross-sectional view illustrating a detailed fastening structure that connects the end plate and the side member by the connecting bolt according to a first modified embodiment of the present invention.

FIG. 8 is an enlarged cross-sectional view illustrating a detailed fastening structure that connects each of the end plates 61, 63 and the side member 62 by the connecting bolt 64 according to a first modified embodiment of the present invention. The fuel cell according the first modified embodiment is similar to the fuel cell 10 according to the above-described embodiment, except that the cushion joint 66*a* is provided instead of the cushion joint 66 in the above-described embodiment. The construction of the cushion joint 66*a* is similar to that of the cushion joint 66 in the above-described embodiment, except that a concave spherical joint 670*a* is provided instead of the concave spherical joint 670 in the above-described embodiment. The concave spherical joint 670*a* has a through hole 674*a* with a diameter larger than the diameter of the through hole 664 in the concave spherical joint 660.

According to the fuel cell of the first modified embodiment as described above, the diameter of the through hole 674*a* of the concave spherical joint 670*a* is larger than the through hole 664 in the convex spherical joint 660. Thus, the area in which the cushion joint 66*a* is movable can be expanded, as compared with the case in which the diameter of the through hole 674 in the concave spherical joint 670 is the same as the diameter of the through hole 664 in the convex spherical joint 660. As a result, concentration of stress on a single portion of the bolt shank 644 is further suppressed.

Figure 9:
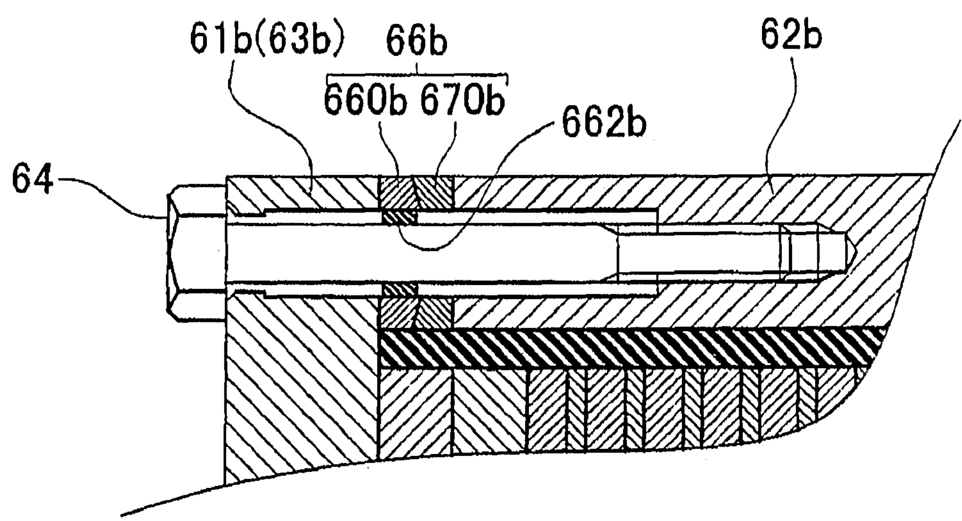
FIG. 9 is an enlarged cross-sectional view illustrating a detailed fastening structure that connects an end plate and a side member by the connecting bolt according to a second modified embodiment of the present invention.

FIG. 9 is an enlarged cross-sectional view illustrating a detailed fastening structure that connects each of end plates 61*b*, 63*b* and a side member 62*b* by the connecting bolt 64 according to a second modified embodiment of the present invention. The construction of the fuel cell according to the second modified embodiment is similar to the fuel cell 10 according to the above-described embodiment, except that the end plates 61*b*, 63*b* are provided instead of the end plates 61, 63 of the above-described embodiment, the side member

62*b* is provided instead of the side member 62, and the cushion joint 66*b* is provided instead of the cushion joint 66.

The construction of the end plates 61*b*, 63*b* in the second modified embodiment is similar to that of the end plates 61, 63 of the above-described embodiment, except that the engagement opening 616 in which the convex spherical joint 660 is fitted is not formed. The construction of the side member 62*b* in the second modified embodiment is similar to that of the side member 62 of the above-described embodiment, except that the engagement opening 622 in which the concave spherical joint 670 is fitted is not formed.

The construction of the cushion joint 66*b* in the second modified embodiment includes a convex spherical joint 660*b*, instead of the convex spherical joint 660, and further includes a concave spherical joint 670*b*, instead of the concave spherical joint 670. The construction of the convex spherical joint 660*b* of the second modified embodiment is similar to that of the convex spherical joint 660 in the above-described embodiment, except that the engagement portion 662 that is fitted in the end plates 61, 63 is not formed. The construction of the concave spherical joint 670*b* of the second modified embodiment is similar to that of the concave spherical joint 670 in the above-described embodiment, except that the engagement portion 676 that is fitted in the side member 62 is not formed.

The cushion joint 66*b* in the second modified embodiment has an elastic ring 662 that fills the gap between the through hole 664 of the convex spherical joint 660*b* and the bolt shank 644, in addition to the convex spherical joint 660*b* and the convex spherical joint 670*b*. In the second modified embodiment, the elastic ring 662*b* is a tubular member made of rubber. The material of the elastic ring 662*b* may be any elastic material softer than the cushion joint 66*b* and the connecting bolt 64. Incidentally, as another modification, similar to the convex spherical joint 660*b*, an elastic ring that fills the gap between the through hole 674 of the concave spherical joint 670*b* and the bolt shank 644 may be provided in the cushion joint 66*b*.

According to the fuel cell as described in the second modified embodiment, the center of the convex spherical joint 660*b* is easily positioned on the shaft center of the bolt shank 644. As a result, the area in which the concave spherical joint 670*b* is movable is prevented or suppressed from being narrowed by the misalignment between the center of the convex spherical surface 660*b* and the shaft center of the bolt shank 644.

Figure 10:
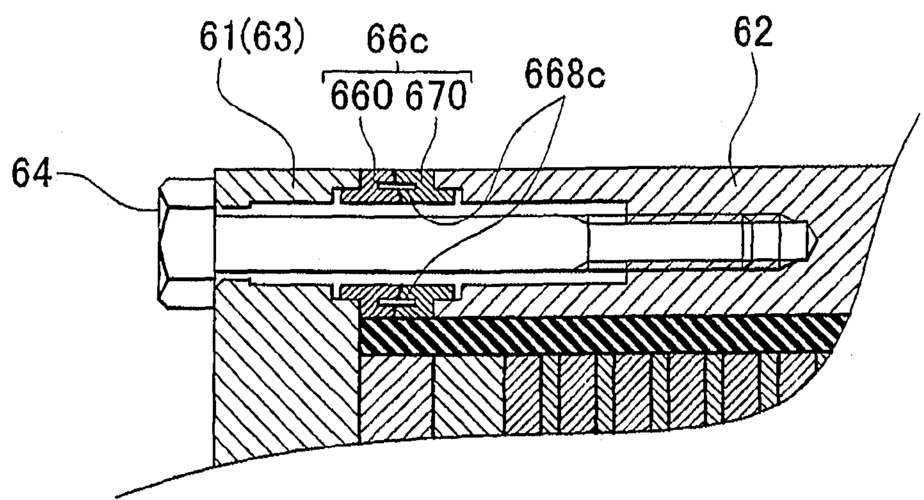
FIG. 10 is an enlarged cross-sectional view illustrating a detailed fastening structure that connects the end plate and the side member by the connecting bolt according to a third modified embodiment of the present invention.

FIG. 10 is an enlarged cross-sectional view illustrating a detailed fastening structure that connects each of the end plates 61, 63 and the side member 62 by the connecting bolt 64 according to a third modified embodiment of the present invention. The construction of the fuel cell in the third modified embodiment is similar to that of the fuel cell 10 in the above-described embodiment, except that a cushion joint 66*c* is provided instead of the cushion joint 66 in the above-described embodiment. The construction of the cushion joint 66*c* in the third modified embodiment is similar to that of the cushion joint 66 in the above-described embodiment, except that a rod-like pin 668*c* embedded in and extends between the convex spherical joint 660 and the concave spherical joint 670 is provided. The material of the pin 668*c* may be metal or plastic.

According to the fuel cell of the above-described third modified embodiment, the strength of the pin 668*c* is adjusted such that the pin 668*c* is cut or broken before the bolt shank 644 is plastically deformed. As a result, the side member 62 is prevented from being bent excessively to the point that the bolt shank 644 is plastically deformed.

Figure 11:
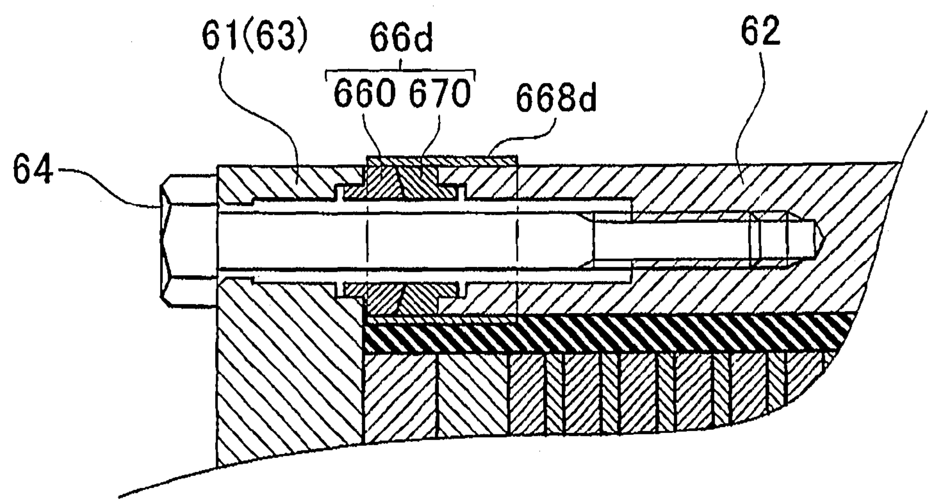
FIG. 11 is an enlarged cross-sectional view illustrating a detailed fastening structure that connects an end plate and a side member by the connecting bolt according to a fourth modified embodiment of the present invention.

FIG. 11 is an enlarged cross-sectional view illustrating a detailed fastening structure that connects each of the end plates 61, 63 and the side member 62 by the connecting bolt 64 according to a fourth modified embodiment of the present invention. The construction of the fuel cell of the fourth modified embodiment is similar to that of the fuel cell 10 of the above-described embodiment, except that the cushion joint 66*d* is provided instead of the cushion joint 66 of the above-described embodiment. The construction of the cushion joint 66*d* of the fourth modified embodiment is similar to that of the cushion joint 66 of the above-described embodiment, except that a tubular cover 668*d* that holds the convex spherical joint 660 and the concave spherical joint 670 is provided. The material of the cover 668*d* may be metal or plastic.

According to the fuel cell of the above-described fourth modified embodiment, the strength of the cover 668*d* is adjusted such that the cover 668*d* is deformed before the bolt shank 644 is plastically deformed. As a result, the side member 62 is prevented from being bent excessively to the point that the bolt shank 644 is plastically deformed.

Figure 12:
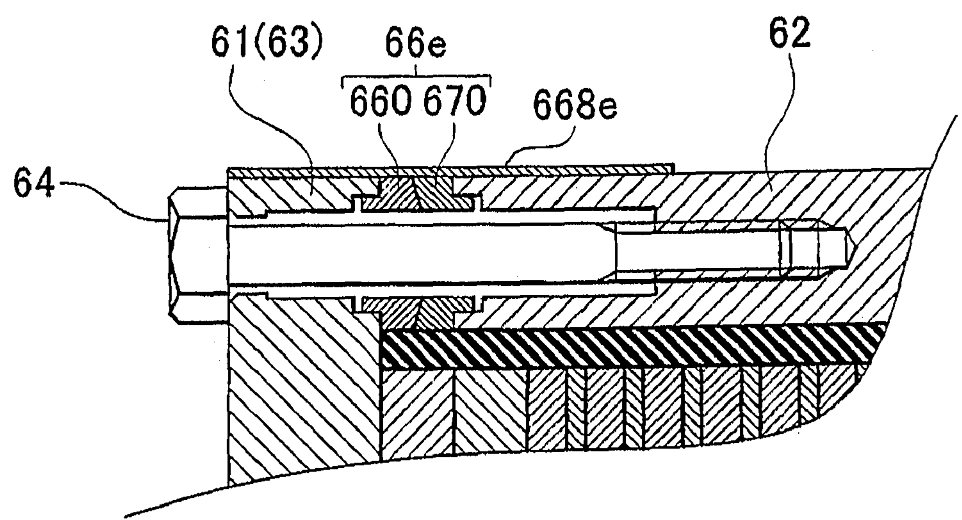
FIG. 12 is an enlarged cross-sectional view illustrating a detailed fastening structure that connects an end plate and a side member by the connecting bolt according to a fifth modified embodiment of the present invention.

FIG. 12 is an enlarged cross-sectional view illustrating a detailed fastening structure that connects each of the end plates 61, 63 and the side member 62 by the connecting bolt 64 according to a fifth modified embodiment of the present invention. The construction of the fuel cell of the fifth modified embodiment is similar to that of the fuel cell 10 of the above-described embodiment, except that a cushion joint 66*e* is provided instead of the cushion joint 66 of the above-described embodiment. The construction of the cushion joint 66*e* of the fifth modified embodiment is similar to that of the cushion joint 66 of the above-described embodiment, except that a beam 668*e* is provided. The beam 668*e* extends over the end plate 61, 63, the convex spherical joint 660, the concave spherical joint 670 and the side member 62. The material of the beam 668*e* may be metal or plastic.

According to the fuel cell of the above-described fifth modified embodiment, the strength of the beam 668*e* is adjusted such that the beam 668*e* is cut or broken before the bolt shank 644 is plastically deformed. As a result, the side member 62 is prevented from being bent excessively to the point that the bolt shank 644 is plastically deformed.

Figure 13:
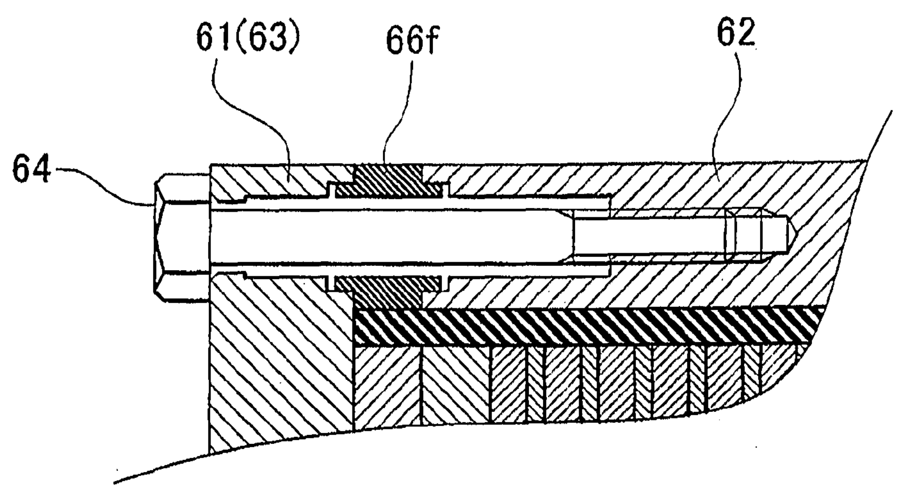
FIG. 13 is an enlarged cross-sectional view illustrating a detailed fastening structure that connects an end plates and the side member by the connecting bolt according to a sixth modified embodiment of the present invention.

FIG. 13 is an enlarged cross-sectional view illustrating a detailed fastening structure that connects each of the end plate 61, 63 and the side member 62 by the connecting bolt 64 according to a sixth modified embodiment of the present invention. The construction of the fuel cell of the sixth modified embodiment is similar to that of the fuel cell 10 of the above-described embodiment, except that the cushion joint 66*f* is provided instead of the cushion joint 66 of the above-described embodiment. The cushion joint 66*f* of the sixth modified embodiment is a tubular elastic body having the shape of joining or integrating the convex spherical joint 660 and the concave spherical joint 670 of the above-described embodiment. The material of the cushion joint 66*f* may be any material that has the elasticity and shape that allows the bolt shank 644 to bend under the condition in which the cushion joint 66*f* is held between the end plate 61, 63 and the side member 62. The material of the cushion joint 66*f* may be laminated rubber in which rubber layers and hard material layers are alternately laminated, as well as engineering plastics, such as polyacetal or polyamides, or hard rubber.

According to the fuel cell of the above-described sixth modified embodiment, the deformation of the elastic cushion joint 661 enables the bolt shank 644 to bend in the cushion joint 66*f*, when the side member 62 is bent in the direction intersecting the stacking direction Ds.

Figure 14:
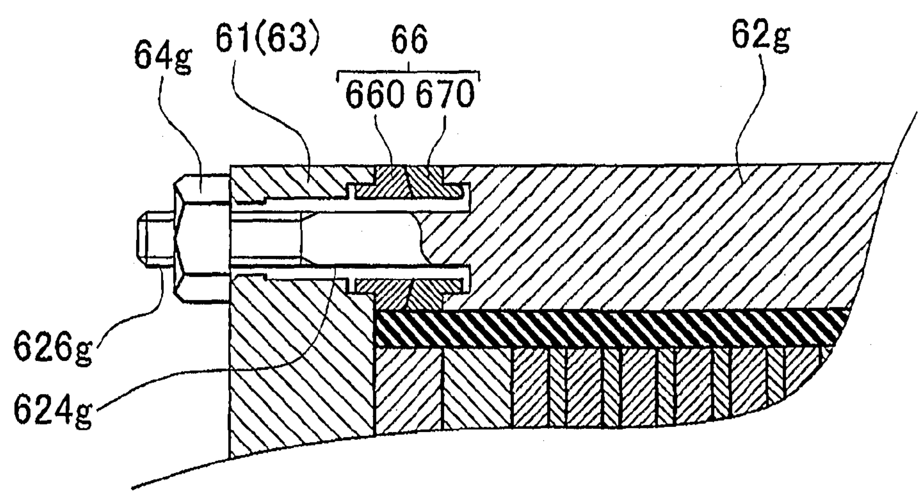
FIG. 14 is an enlarged cross-sectional view illustrating a detailed fastening structure that connects the end plate and a side member by a connecting nut according to a seventh modified embodiment of the present invention.
Figure 15:
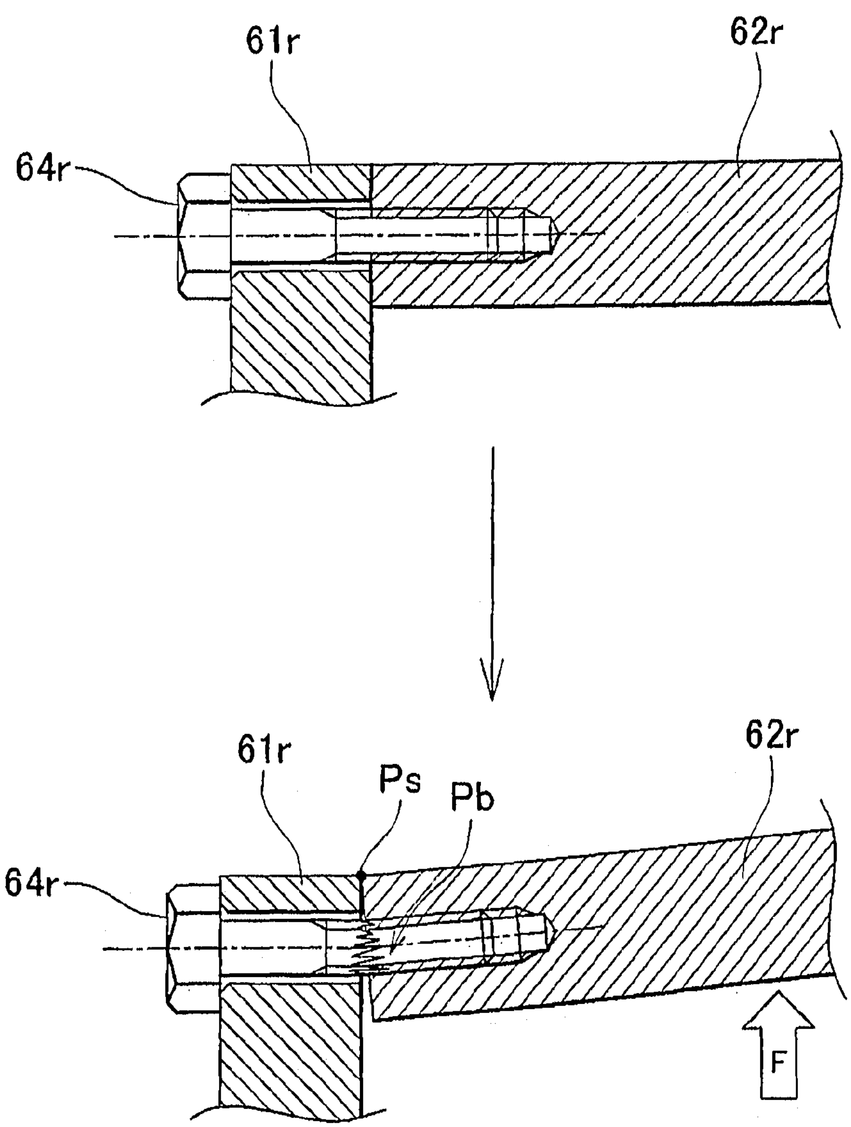
FIG. 15 is a view illustrating a fastening structure according to a related art that fastens a fuel cell.

FIG. 14 is an enlarged cross-sectional view illustrating a detailed fastening structure that connects each of the end plates 61, 63 and a side member 62*g* by a connecting nut 64*g* according to a seventh modified embodiment of the present invention. The construction of the fuel cell of the seventh modified embodiment is similar to that of the fuel cell 10 of the above-described embodiment, except that the side member 62*g* and the connecting nut 64*g* are provided instead of the side member 62 and the connecting bolt 64. The side member 62*g* of the seventh modified embodiment is similar to the side member 62 of the above-described embodiment, except that a round bar bolt shank 624*g* on which a male thread portion 626*g* is formed is provided, instead of the female thread portion 626. The bolt shank 624*g* of the side member 62*g* penetrates the end plate 61, 63 and is threaded with the connecting nut 64*g* from the side of end plate 61, 63.

According to the fuel cell of the above-described seventh modified embodiment, similar to the embodiment described above, because the bolt shank 624*g* is bent with the side member 62*g* in the cushion joint 66, concentration of stress on a single portion of the bolt shank 624*g* is suppressed or prevented. As a result, the size of the bolt shank 624*g* does not need to be much increased, and the strength against the force F in the direction intersecting the stacking direction Ds of the fuel cell stack 50 improves.

In the above-described embodiment, the convex spherical joint 660 is disposed on the side of end plate 61, 63, and the concave spherical joint 670 is disposed on the side of side member 62. However, the concave spherical joint 670 may be disposed on the side of the end plate 61, 63, and the convex spherical joint 660 may be disposed on the side of side member 62, in another modified embodiment. In this modified embodiment, the centers of the spherical surfaces of the concave spherical joint and the convex spherical joint are preferably located near the point P2 on the shaft center of a portion of the bolt shank 644 threaded with the side member 62 as shown in FIG. 7.

Further, the above-described embodiment may be modified such that the female thread portion 626 may be provided without the hole 624 in the side member 62. Furthermore, a metal coil spring may be used as the cushion joint, instead of the elastic cushion joint 66*f* in the sixth modified embodiment. In addition, combinations of the constructions as described in the first to seventh modified embodiment may be applied to a fuel cell. Further, in the above-described embodiments, the recirculation type fuel cell is used; however, as another embodiment, a dead-end type fuel cell, which finishes up the fuel gas once supplied to the fuel cell, may be used.

Incidentally, the fuel cell or fuel cell fastening device of the present invention may be used in a vehicle that travels with the electric power produced by the fuel cell, or a fuel cell system that operates the fuel cell.

The invention claimed is:

1. A fuel cell that electrochemically generates electricity using reaction gas, comprising:

- a fuel cell stack in which a plurality of fuel cell units are stacked on one another;
- a pair of end plates respectively contact both ends of the fuel cell stack in a direction in which the plurality of fuel cell units are stacked;
- a side member that extends in the stacking direction and is disposed between the pair of end plates;
- a connecting bolt portion, that has a bolt shank penetrating one of the end plates substantially along the stacking direction, and connects the one of the end plates and the side member; and
- a cushion joint disposed between the side member and the one of the end plates, and through which the bolt shank passes;
- the cushion joint having a first spherical joint provided on the side of one of the end plates, at first through hole in which the bolt shank is fitted freely and a first spherical surface facing toward the side member, the cushion joint also having a second spherical joint provided on the side of the side member, a second through hole in which the bolt shank is fitted freely, a second spherical surface that slidably engages with the first spherical surface of the first spherical joint and a diameter of the second through hole that is greater than a diameter of the first through hole joint;
- wherein the cushion joint causes the bolt shank to elastically bend with the side member in the cushion joint when the side member is elastically bent in the direction intersecting the stacking direction so as to prevent concentration of a stress at a single portion of the bolt shank.

2. The fuel cell according to claim 1, wherein the cushion joint further includes an elastic ring that fills the gap between at least one of the first through hole and the second through hole and the bolt shank.

3. The fuel cell according to claim 1, wherein the first spherical joint includes a first engagement portion that is fitted in the one of the end plates to position the first spherical joint.

4. The fuel cell according to claim 1, wherein the second spherical joint includes a second engagement portion that is fitted in the side member to position the second spherical joint.

5. The fuel cell according to claim 1, wherein roughness of at least one of the first spherical surface and the second spherical surface is coarser than roughness of other surface of the cushion joint.

6. The fuel cell according to claim 1, wherein the cushion joint further includes a pin embedded in the first spherical joint and the second spherical joint.

7. The fuel cell according to claim 1, wherein the cushion joint further includes a tubular cover that holds the first spherical joint and the second spherical joint.

8. The fuel cell according to claim 1, wherein the cushion joint further includes a beam extending over the one of the end plates, the first spherical joint, the second spherical joint and the side member.

9. The fuel cell according to claim 1, wherein the fast spherical surface is a convex surface and the second spherical surface is a concave surface.

10. The fuel cell according to claim 1, wherein at least a portion of the cushion joint is formed of an elastic body.

11. The fuel cell according to claim 1, wherein the connecting bolt portion further includes a nut that is threaded with the bolt shank to connect the one of the end plates and the side member.

12. The fuel cell according to claim 1, wherein the bolt shank has a thread portion that engages with the side member to connect the one of the end plates and the side member.

13. A fuel cell fastening device that fastens a fuel cell stack in which a plurality of fuel cell units are stacked on one another, comprising:

- a pair of end plates respectively contact both ends of the fuel cell stack in a direction in which the plurality of fuel cell units are stacked;
- a side member that extends in the stacking direction and is disposed between the pair of end plates;

a connecting bolt portion that has a bolt shank penetrating one of the end plates substantially along the stacking direction, and connects the one of the end plates and the side member; and a cushion joint disposed between the side member and the one of the end plates, and through which the bolt shank passes;

the cushion joint having a first spherical joint provided on the side of one of the end plates, a first through hole in which the bolt shank is fitted freely and a first spherical surface facing toward the side member, the cushion joint also having a second spherical joint provided or the side of the side member, a second through hole in which the bolt shank is fitted freely, a second spherical surface that slidably engages with the first spherical surface of the first spherical joint and a diameter of the second through hole that is greater than a diameter of the first through hole joint;

wherein the cushion joint causes the bolt shank to elastically bend with the side member in the cushion joint when the side member is elastically bent in the direction intersecting the stacking direction so as to prevent concentration of a stress at a single portion of the bolt shank.

14. The fuel cell according to claim 1, wherein the side member has an aperture and the connecting bolt portion is located at least partially within the side member through the aperture.

15. The fuel cell according to claim 14, wherein the side member is an elongated side member and the aperture is an elongated aperture extending within and along a length of the elongated side member.

16. The fuel cell fastening device according to claim 13, wherein the side member has an aperture and the connecting bolt portion is located at least partially within the side member through the aperture.

17. The fuel cell fastening device according to claim 16, wherein the side member is an elongated side member and the aperture is an elongated aperture extending within and along a length of the elongated side member.

* * * * *

UNITED STATES PATENT AND TRADEMARK OFFICE

CERTIFICATE OF CORRECTION

PATENT NO. : 8,318,378 B2
APPLICATION NO. : 12/529381
DATED : November 27, 2012
INVENTOR(S) : Norihiko Saito et al.

It is certified that error appears in the above-identified patent and that said Letters Patent is hereby corrected as shown below:

In the Claims:

Column 12, line 5 – please delete “plates, at first” and insert --plates, a first--; and Column 13, line 12 – please delete “provided or the side” and insert --provided on the side--.

Signed and Sealed this
Twenty-eighth Day of January, 2014

Michelle K. Lee
*Deputy Director of the United States Patent and Trademark Office*